(12) United States Patent
Nishimura

(10) Patent No.: US 11,791,732 B2
(45) Date of Patent: Oct. 17, 2023

(54) SOLAR PHOTOVOLTAIC OUTPUT OPTIMIZER CIRCUIT

(71) Applicants: MERSINTEL, K.K., Kyoto (JP); CEF., LTD., Nemuro (JP)

(72) Inventor: Hiroyuki Nishimura, Kyoto (JP)

(73) Assignees: MERSINTEL, K.K., Kyoto (JP); CEF., LTD., Nemuro (JP)

(*) Notice: Subject to any disclaimer, the term of this patent is extended or adjusted under 35 U.S.C. 154(b) by 353 days.

(21) Appl. No.: 17/296,443

(22) PCT Filed: Dec. 5, 2019

(86) PCT No.: PCT/JP2019/047618
§ 371 (c)(1),
(2) Date: May 24, 2021

(87) PCT Pub. No.: WO2020/116559
PCT Pub. Date: Jun. 11, 2020

(65) Prior Publication Data
US 2022/0021309 A1  Jan. 20, 2022

(30) Foreign Application Priority Data
Dec. 6, 2018 (JP) .................. 2018-228830

(51) Int. Cl.
*H02M 3/335* (2006.01)
*H02S 40/30* (2014.01)

(52) U.S. Cl.
CPC ......... *H02M 3/33573* (2021.05); *H02S 40/30* (2014.12)

(58) Field of Classification Search
CPC .............................................. H02M 3/33573
(Continued)

(56) References Cited

U.S. PATENT DOCUMENTS

| 2012/0080955 A1 | 4/2012 | Fishman et al. |
| 2012/0275196 A1* | 11/2012 | Chapman ................ H02J 3/381 |
| | | 363/17 |

(Continued)

FOREIGN PATENT DOCUMENTS

| JP | 2006-101581 A | 4/2006 |
| JP | 2011-170836 A | 9/2011 |

(Continued)

OTHER PUBLICATIONS

PCT/ISA/210, "International Search Report for International Application No. PCT/JP2019/047618," dated Jan. 7, 2020.

*Primary Examiner* — Joseph Chang
(74) *Attorney, Agent, or Firm* — Manabu Kanesaka

(57) ABSTRACT

A solar photovoltaic output optimizer circuit utilizes generated energy without waste. The optimizer circuit includes a solar photovoltaic power generation input device for receiving the generated output of a solar photovoltaic panel, a switching device, and a voltage doubler rectification device, and further includes: a first power collection circuit that connects a connection point between a source electrode of a second switching transistor of the switching device and one end of a primary winding of a transformer of the voltage doubler rectification device to a drain electrode of a sixth switching transistor; and a second power collection circuit including a seventh switching transistor whose drain electrode is connected to a drain electrode of a fifth switching transistor of the switching device and whose source electrode is connected to a source electrode of the sixth switching transistor of the first power collection circuit and an anode electrode of a third diode.

4 Claims, 11 Drawing Sheets

(58) Field of Classification Search
USPC .......................................................... 307/84
See application file for complete search history.

(56) References Cited

U.S. PATENT DOCUMENTS

2017/0229873 A1* 8/2017 Nishimura .............. H02M 3/07
2017/0256953 A1   9/2017 Nishimura

FOREIGN PATENT DOCUMENTS

| JP | 2013-541930 A | 11/2013 |
| JP | 2016-039673 A | 3/2016 |
| JP | 2016-057685 A | 4/2016 |
| JP | 6005109 B2 | 10/2016 |
| JP | 2018-038149 A | 3/2018 |

* cited by examiner

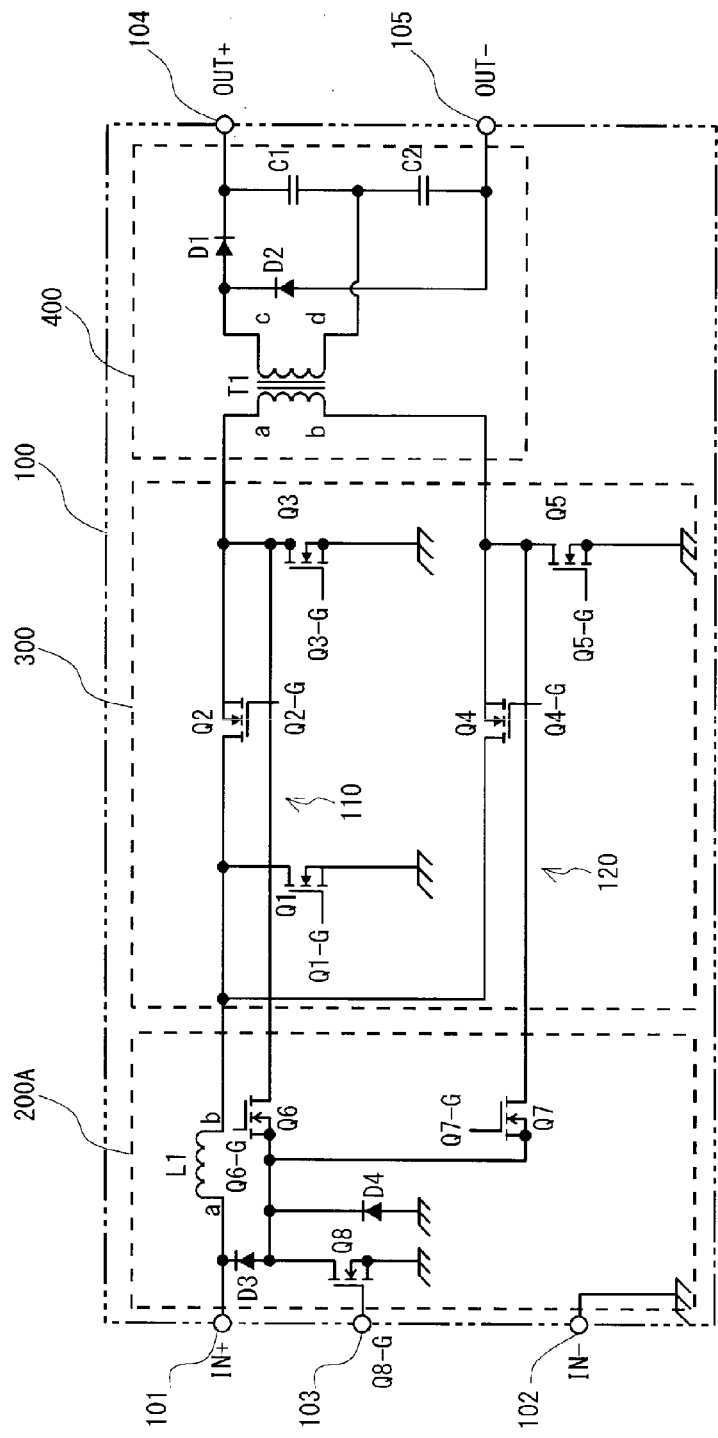
[Figure 1]

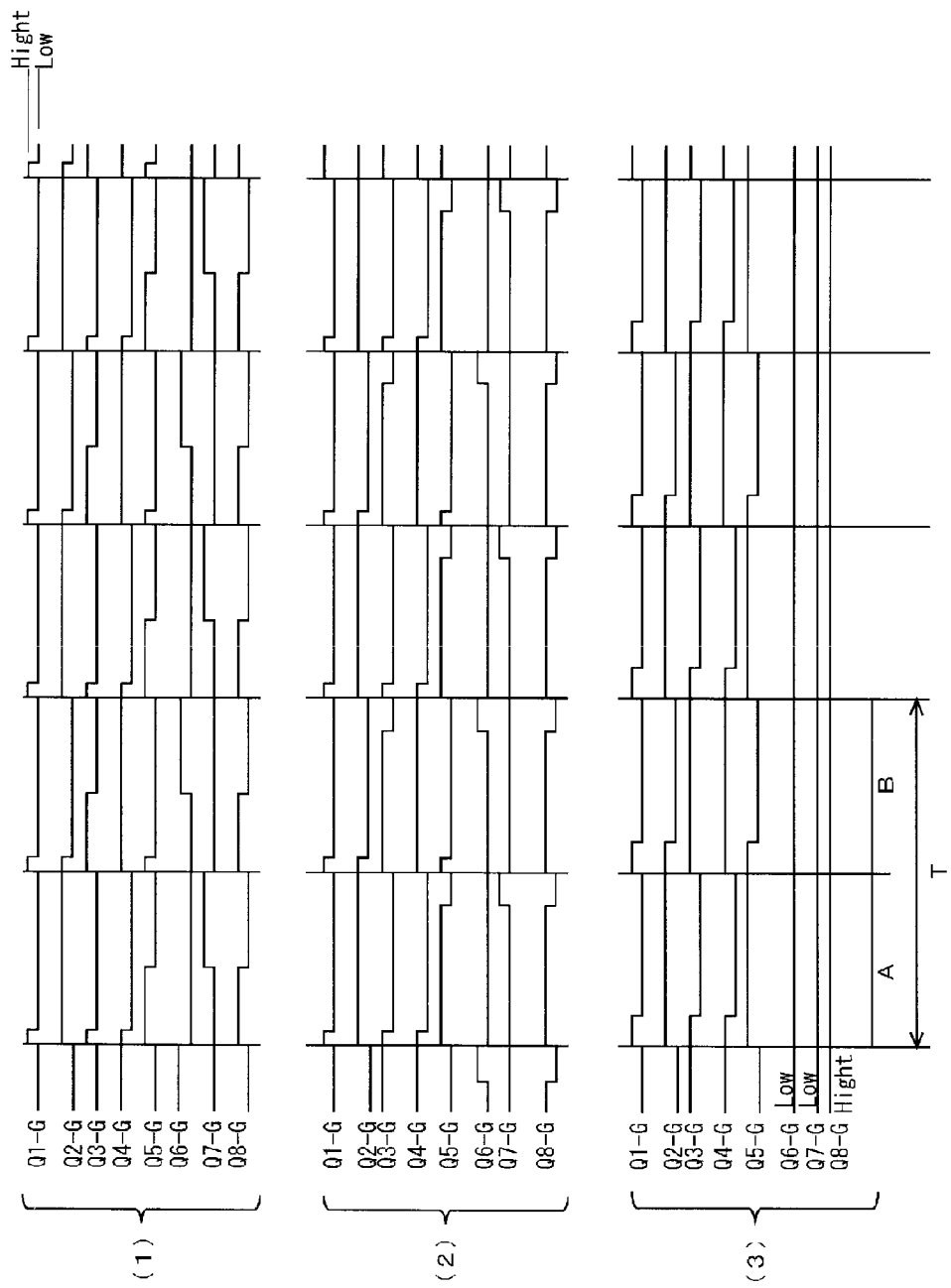
[Figure 2]

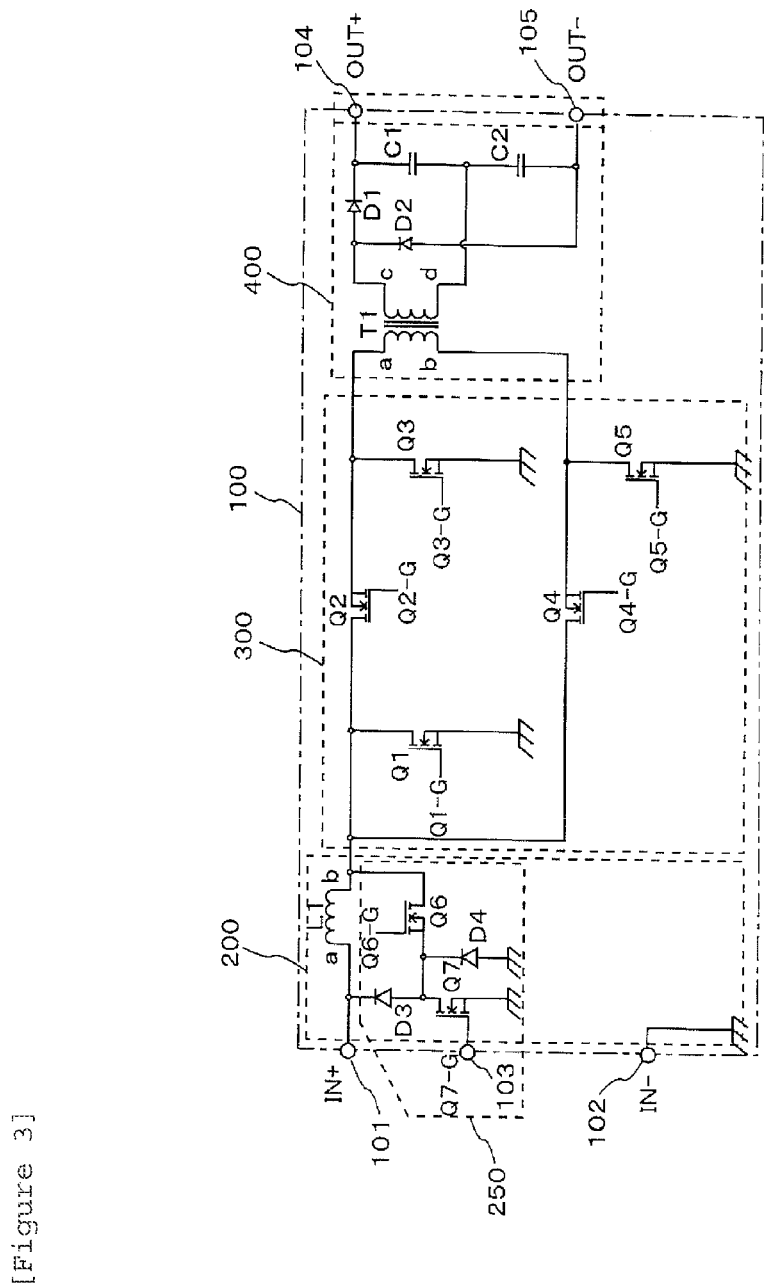
[Figure 3]

[Figure 4]
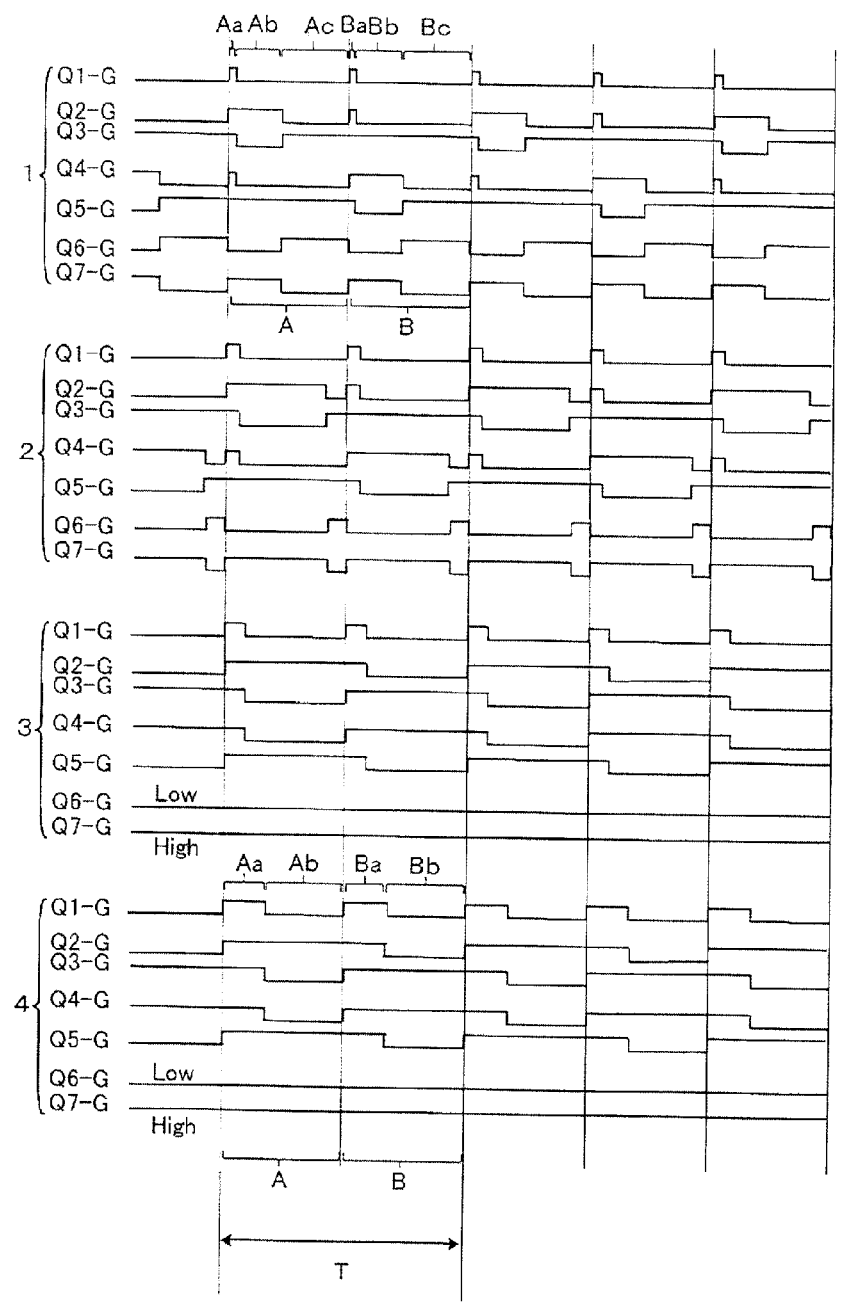

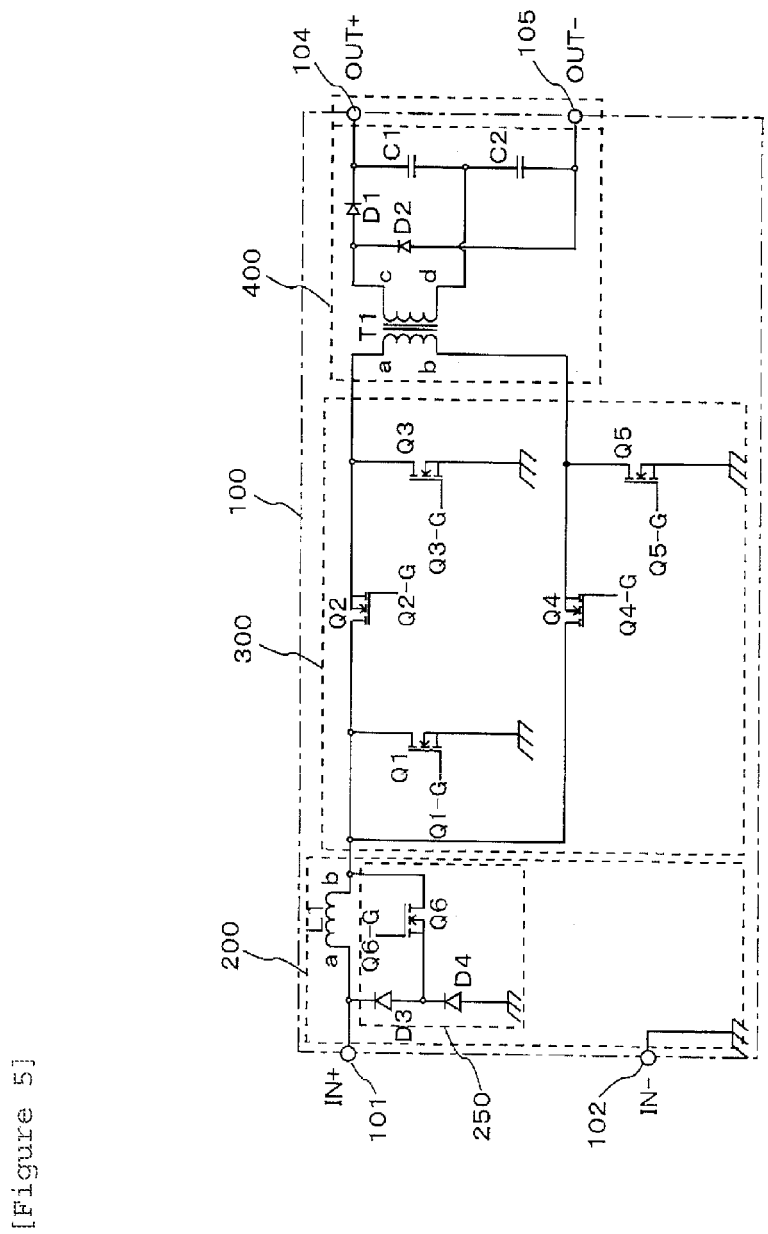
[Figure 5]

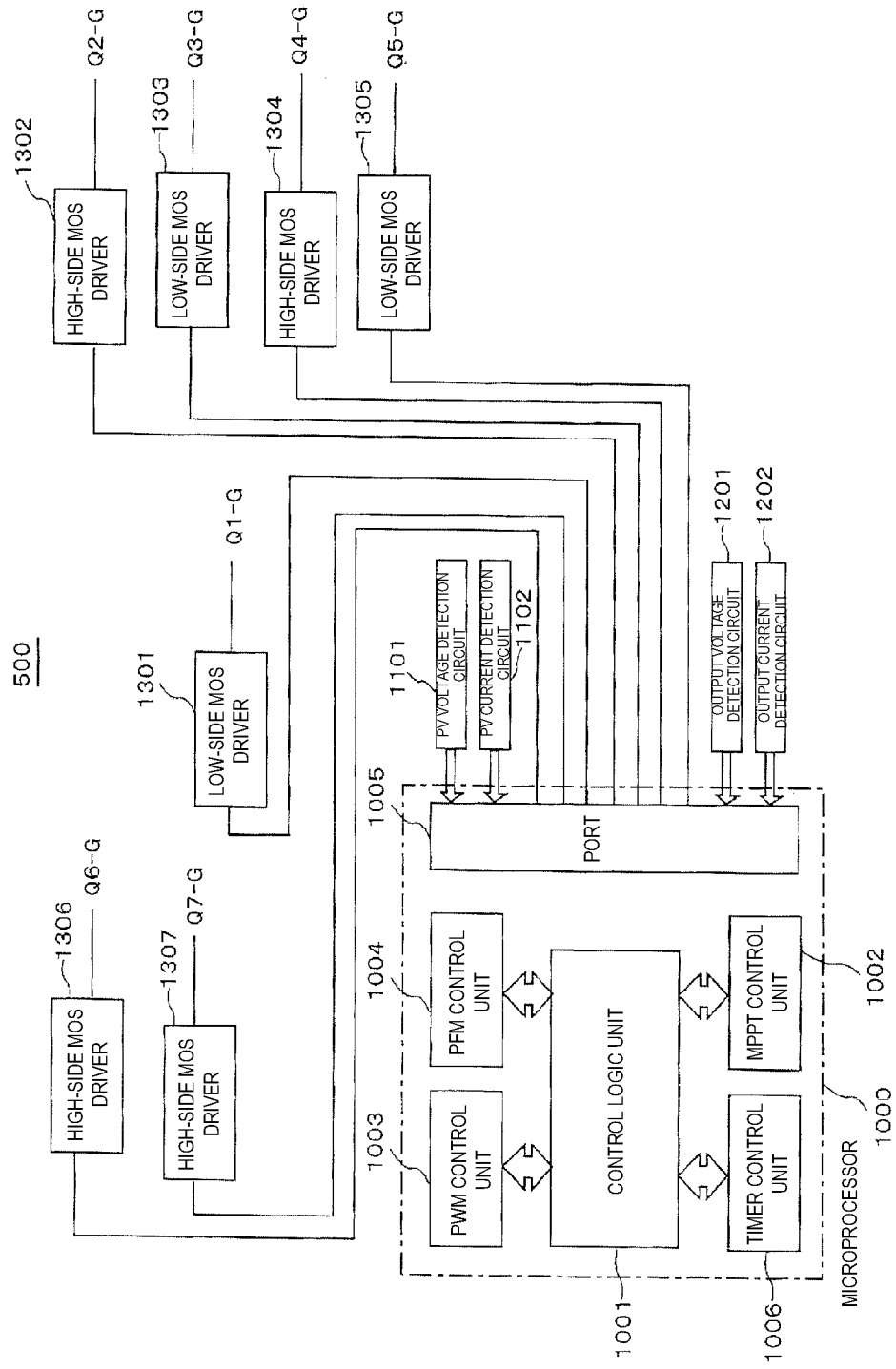
[Figure 6A]

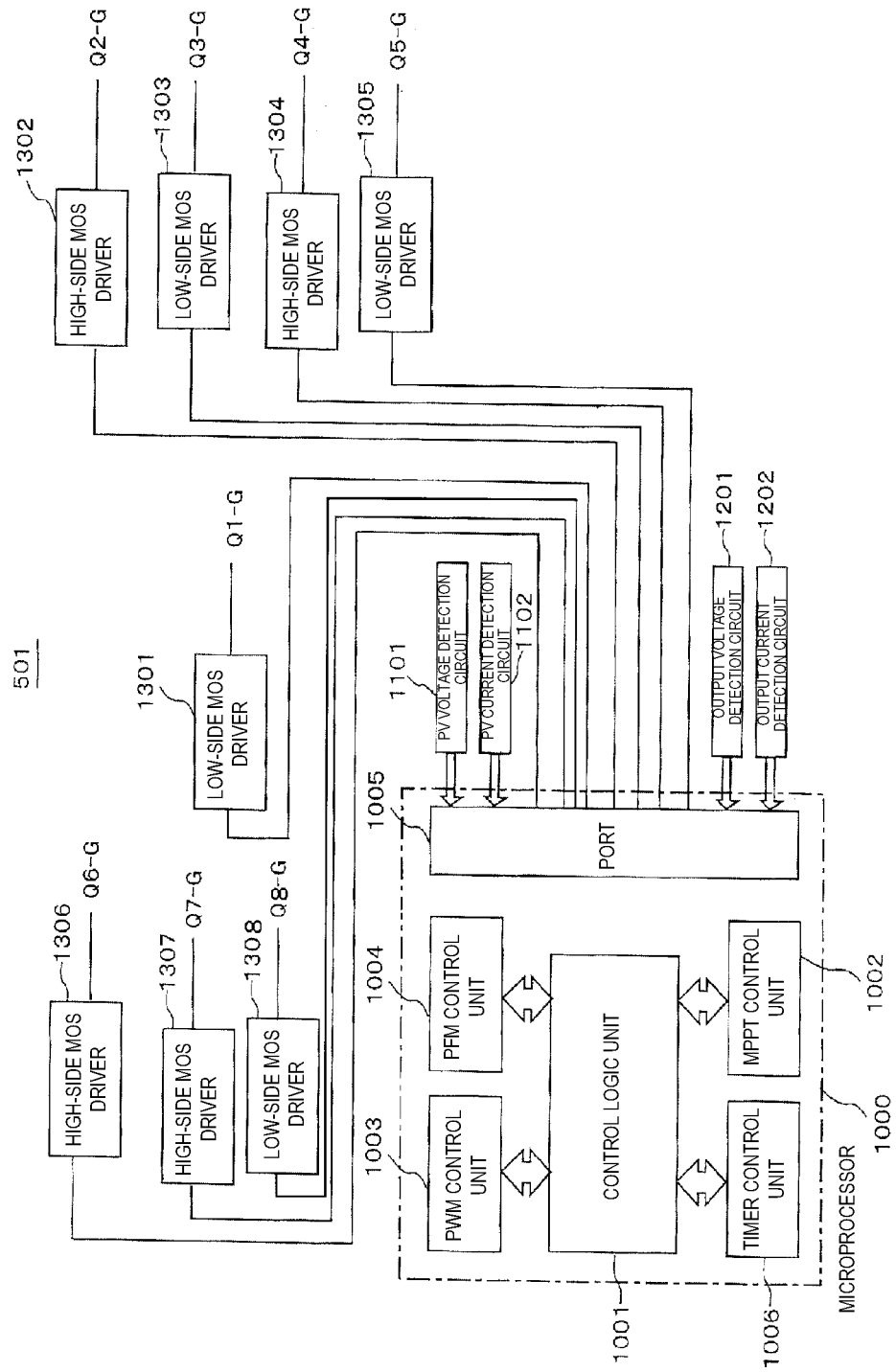
[Figure 6B]

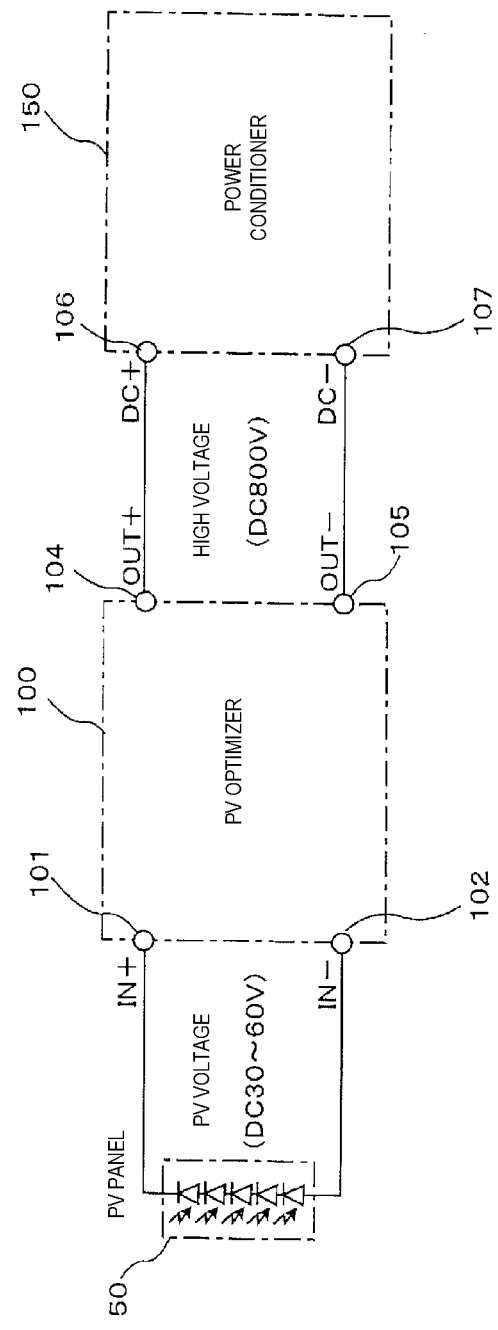
[Figure 7]

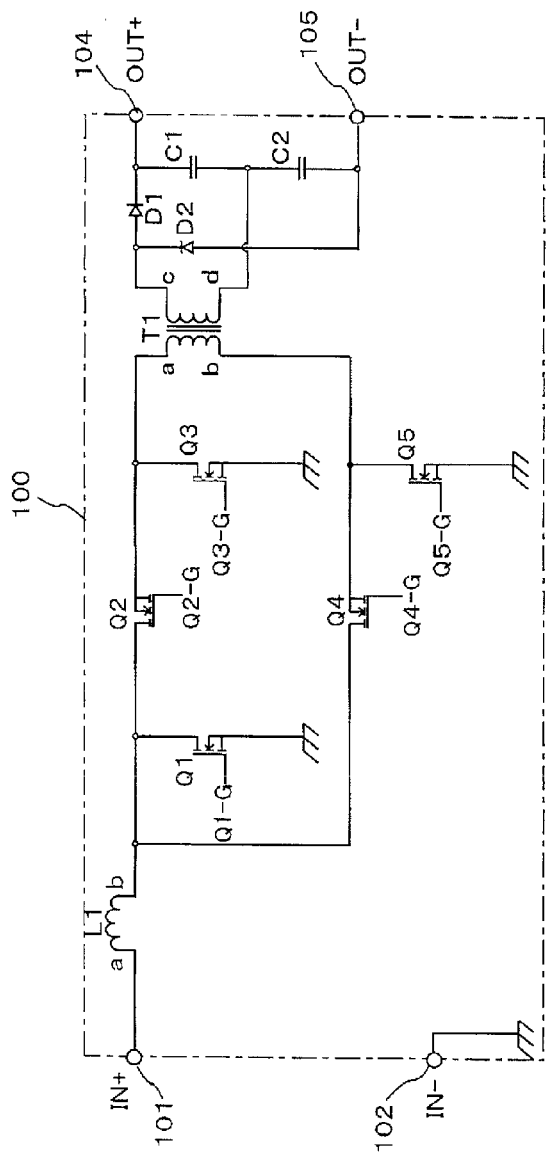
[Figure 8]

[Figure 9]
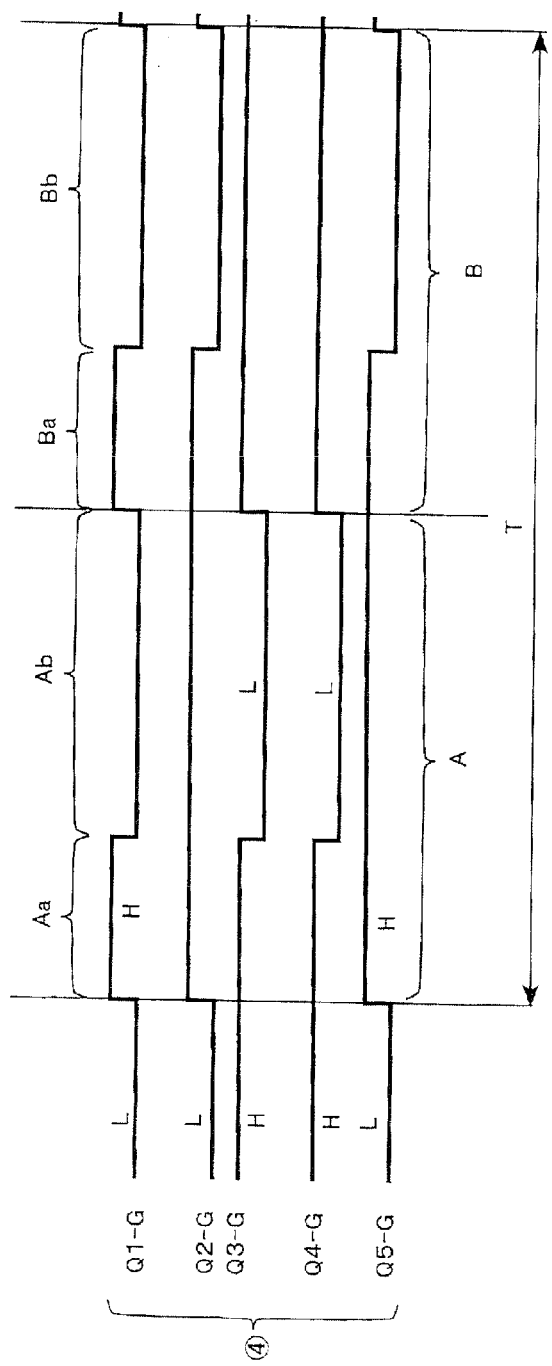

[Figure 10]
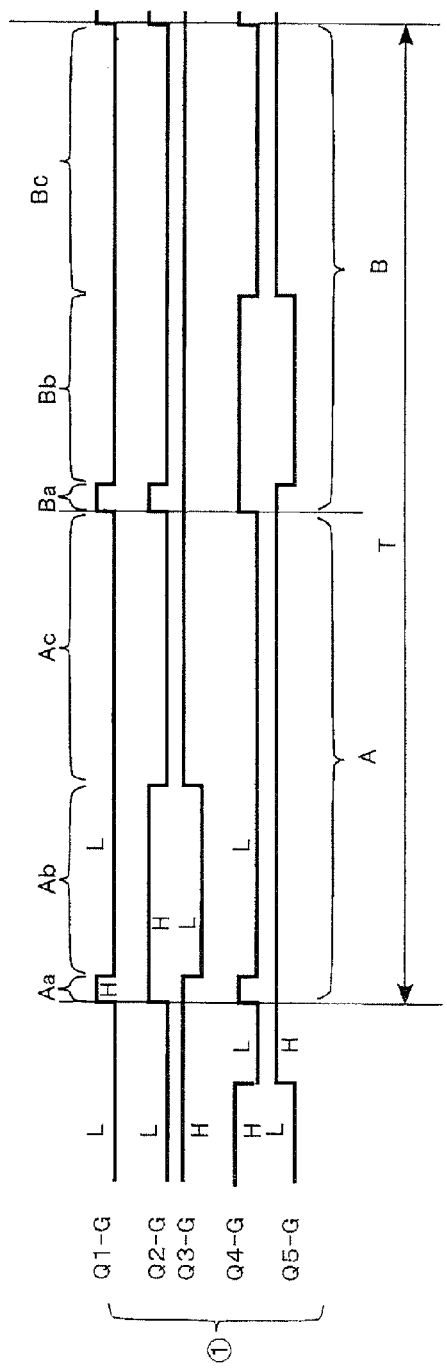

SOLAR PHOTOVOLTAIC OUTPUT OPTIMIZER CIRCUIT

RELATED APPLICATIONS

The present application is National Phase of International Application No. PCT/JP2019/047618 filed Dec. 5, 2019, and claims priority from Japanese Application No. 2018-228830, filed Dec. 6, 2018, the disclosure of which is hereby incorporated by reference herein in its entirety.

TECHNICAL FIELD

The present invention relates to a power generation system through use of a solar photovoltaic panel and, in particular, to a solar photovoltaic output optimizer circuit that can stably harvest generated output with high efficiency by optimizing output from a solar photovoltaic panel with large output variation.

BACKGROUND ART

Along with diversification of energy resources, power generation through use of a solar photovoltaic panel has become widespread as a type of renewable energy. Against the backdrop of lack of energy sources and reduction in $CO_2$ emission in recent years, large-scale solar photovoltaic power generation plants, each of which exceeds 1000 kW and is called mega solar, have been actively built. Hereinafter, solar power generation is also called PV (Photo-Voltaic), and a solar photovoltaic panel (or solar panel) used therefor is also called a PV panel.

Output of a PV panel varies according to the amount of irradiation light. In particular, when the amount of light is small, such as at dawn, the output is small and the internal impedance is high. Connection of a load in a state with a high internal impedance reduces the voltage, which prevents normal operation as a power source, and the power source becomes an unstable power source. Control for stable operation even in a state where a PV panel receives a low amount of light is required. Such control is called optimization. Specific optimization means (circuit) is called an optimizer.

FIG. 8 is a circuit diagram illustrating a basic configuration of a conventional PV optimizer. FIG. 9 is an operation waveform diagram showing the level of gate signal of switching transistors constituting the circuit of FIG. 8. In FIG. 8, the "+" output and "−" output of the PV panel (not shown) are input into a PV input 101 (IN+) and a PV input 102 (IN−) of an optimizer 100: ground. Reference signs Q1, Q2, Q3, Q4 and Q5 denote first, second, third, fourth and fifth switching transistors, respectively. MOSFETs for N-channel power are adopted therefor. The enhancement type shown in the diagram is preferable for this circuit. However, the type is not necessarily limited thereto. Any type having similar functions may be adopted instead. Reference sign L1 denotes an inductance that has one end a connected to the PV input 101, and another end b connected to the drain electrode terminals of the first switching transistor Q1, the second switching transistor Q2 and the fourth switching transistor Q4.

Reference sign T1 denotes a transformer that has one terminal a of primary winding (on the primary side) connected to the source electrode of the second switching transistor Q2 and the drain electrode of the third switching transistor Q3, and another electrode b connected to the source electrode of the fourth switching transistor Q4 and the drain electrode of the fifth switching transistor Q5. An end c of secondary winding (on the secondary side) of the transformer T1 that has the same polarity as that of the end a on the primary side is connected to the anode of a first diode D1 and the cathode of a second diode D2. Another end d is connected to a series connection point between a first capacitor C1 and a second capacitor C2, which are connected in series. One end of the first capacitor C1 is connected to the cathode of the first diode D1 and one output 104 (OUT+) between the optimizer outputs. One end of the second capacitor C2 is connected to the anode of the second diode D2 and the other output 105 (OUT−) between the optimizer outputs.

The source electrode of the first switching transistor Q1, the source electrode of the third switching transistor Q3, and the source electrode of the fifth switching transistor Q5 are connected to the ground. The second transistor Q2 and the fourth switching transistor Q4 constitute a high-side switch. The third switching transistor Q3 and the fifth switching transistor Q5 constitute a low-side switch.

In the PV optimizer 100 shown in FIG. 8, waveforms shown in FIG. 9 are applied as the gate signals Q1-G, Q2-G, Q3-G, Q4-G and Q5-G of the first switching transistor Q1, the second switching transistor Q2, the third switching transistor Q3, the fourth switching transistor Q4 and the fifth switching transistor Q5. Means for generating the gate signals Q1-G, Q2-G, Q3-G, Q4-G and Q5-G of the first to fifth switching transistors Q1 to Q5 is described later. The PV optimizer 100 is a bridge type step-up and voltage doubler rectification circuit (hereinafter simply referred to as a voltage doubler rectification circuit). In FIG. 9, the switching frequency is, for example, 50 kHz. The first half of one period T is A, and the latter half is B. When the gate signal G in the first or latter half is at a high level (H), the corresponding transistor is ON. When the signal is at a low level (L), this transistor is OFF.

In the normal operation state, in the first half A of the period T, in an Aa interval, all the first to fifth switching transistors Q1 to Q5 are ON to excite the inductance L1; in an Ab interval, the first switching transistor Q1, the third switching transistor Q3 and the fourth switching transistor Q4 are turned OFF to thereby turn on the second switching transistor Q2 and the fifth switching transistor Q5. Consequently, the end a on the primary side of the transformer T1 is positive (+) and the other end b is ground (GND), thereby exciting the transformer T1 in the direction from the one end a to the other end b.

Upon entering the latter half B of one period T, all the first to fifth switching transistors Q1 to Q5 are turned on to excite the inductance L1. Upon entering a Bb interval, the first switching transistor Q1, the second switching transistor Q2 and the fifth switching transistor Q5 are turned off to turn on only the third switching transistor Q3 and the fourth switching transistor Q4, thereby making the other end b on the primary side of the transformer T1 be positive (+) and making the one end a on the primary side of the transformer T1 be the ground (GND) to excite the transformer T1 in the direction from the other end b to the one end a, which is opposite to the above case.

The operation of one period T of the switching frequency is thus finished, and the operation thereafter is its repetition. As with the primary side, the secondary side of the transformer T1 repeats the positive (+) and negative (−) polarities every half a period (T/2) of the switching frequency, and a voltage stepped up twice as high as the secondary-side voltage of the transformer T1 is obtained through the voltage doubler rectification by the first diode D1, the second diode D2, the first capacitor C1 and the second capacitor C2. The first switching transistor Q1 is not necessarily included. However, provision of this transistor can reduce the ON resistance while the second switching transistor Q2 to the fifth switching transistor Q5 are ON and, in turn, reduce the load.

During the normal operation, the operation is performed according to the gate signals shown in FIG. 9, and PWM control that changes the pulse width in the Aa interval in the first half A and the Ba interval of the latter half B in the switching period, and PFM control that changes time in the first half A and the latter half B in the switching period T, i.e., the period, are performed.

Basically, the output of the solar photovoltaic panel (PV panel) varies according to the amount of light with which the panel is irradiated. However, in particular, when the amount of light is small, such as at dawn, the output is also small and the internal impedance is high. Connection of a load in a situation with a high internal impedance reduces the voltage, which prevents a normal operation as a power source. Control is thus required for stable operation even in such a situation.

In order to stably operate the PV panel as a power source even though the panel is at a low output, in the Aa interval and Ba interval that are time periods during which the inductance L1 in FIG. 8 is excited (the period T of the switching signal shown in FIG. 9), driving by significantly short pulses or setting the period of A+B to significantly long is effective.

However, in a case where the Aa interval and Ba interval shown in FIG. 9 are shortened, presence of the transformer T1 increases the time period during which the second switching transistor Q2 and fifth switching transistor Q5, or the third switching transistor Q3 and fourth switching transistor Q4 are ON, and the output of the PV panel is resultantly short-circuited.

FIG. 10 is a waveform diagram of the switching signals of the switching transistors in the case where the amount of irradiation on the PV panel is small and the Aa interval and the Ba interval are reduced. In order to prevent the short circuit of the output of the PV panel, the second switching transistor Q2 and the fourth switching transistor Q4 are turned off for a constant period from the termination of an Ab interval in the first half and a Bb interval in the latter half in the period T, as shown in FIG. 10, the gate signals of the switching transistors are generated so as to achieve a state shown in an Ac interval and a Bc interval.

In particular, when the PV panel is in a significantly low output state, the stable operation can be continued even at a low power by increasing the time periods of the Ac interval and Bc interval as long as possible.

However, at the moment when the second switching transistor Q2 and fourth switching transistor Q4 are turned off as described above, the other end b of the inductance L1 is brought into a released state and a significantly high surge voltage occurs. As a result, the surge voltage is applied to the first switching transistor Q1, second switching transistor Q2 and fourth switching transistor Q4. This application causes a possibility of causing breakage of these switching transistors.

To address this, the applicant of the present application has proposed a circuit shown in FIG. 3 (see Patent Literature 4). A solar photovoltaic output optimizer circuit described in Patent Literature 4 includes means for protecting transistors from a surge voltage that is to occur in an inductance at the time of continuation of a stable operation even when the PV panel is at a low power in a significantly low output state.

Disclosure of such types of conventional arts includes Patent Literature 1, Patent Literature 2, Patent Literature 3, and Patent Literature 4.

CITATION LIST

Patent Literature

Patent Literature 1: Japanese Patent Laid-Open No. 2006-101581
Patent Literature 2: Japanese Patent Laid-Open No. 2011-170836
Patent Literature 3: Japanese Patent Laid-Open No. 2013-541930
Patent Literature 4: Japanese Patent No. 6005109

SUMMARY OF INVENTION

Technical Problem

By adopting the circuit disclosed in Patent Literature 4, transistors can be protected from a surge voltage that is to occur in an inductance at the time of continuation of a stable operation even when the PV panel is at a low power in a significantly low output state. Although the circuit disclosed in Patent Literature 4 has the configuration of protecting the switching transistors by transferring the energy to the step-up circuit in order to protect the switching transistors at the rise time of the PV panel, the protection of the switching transistors is imperfect, and the generated energy at the low output is consumed in the circuit. Accordingly, the generated output of PV is not always effectively utilized.

The present invention has an object to provide a solar photovoltaic output optimizer circuit that can protect switching transistors and utilize the generated energy without waste in a case where the generated output of the PV panel is low.

Solution to Problem

In order to achieve the above object, a solar photovoltaic output optimizer circuit according to the present invention is provided with a step-down circuit in addition to the step-up circuit disclosed in Patent Literature 4 described above. Configuration examples of the present invention are listed as follows. Note that in the following description field of Solution to Problem, signs of embodiments shown in FIG. 1 are assigned to the respective configuration portions to clarify the configuration.

The present invention is a solar photovoltaic output optimizer circuit 100 used for a solar photovoltaic power generation system for stably harvesting power from generated output of a solar photovoltaic panel 50 (FIG. 7) having varying output.

(1) The optimizer includes: solar photovoltaic power generation input means 200A for receiving the generated output of the solar photovoltaic panel 50; switching means 300 for converting DC voltage input into the solar photovoltaic power generation input means 200A into a predetermined pulse voltage or AC voltage; and voltage doubler rectification means 400 for further stepping up the power output of the switching means 300 to a predetermined voltage.

The solar photovoltaic power generation input means 200A includes: an inductance L1 whose one end a is connected to a "+" output of the solar photovoltaic panel 50; a third diode D3 whose cathode electrode is connected to the one end a; a switching transistor Q8 whose drain electrode is connected to an anode electrode of the third diode D3 and whose source electrode is grounded; and a fourth diode D4 whose cathode electrode is connected to the anode electrode of the third diode D3 and whose anode electrode is grounded.

The switching means 300 includes:

a first switching transistor Q1 whose drain is connected to another end b of the inductance L1 and whose source electrode is grounded; and a second switching transistor Q2 whose drain electrode is connected to the other end b of the inductance L1; a third switching transistor Q3 whose drain electrode is connected to a source electrode of the second switching transistor Q2 and whose source electrode is grounded; a fourth switching transistor Q4 whose drain electrode is connected to the other end b of the inductance L1; and a switching transistor Q5 whose drain electrode is connected to a source electrode of the switching transistor Q4 and whose source electrode is grounded.

The voltage doubler rectification means 400 includes:

a transformer T1 where one end a of a primary winding is connected to a connection point between the source electrode of the second switching transistor Q2 and the drain electrode of the third switching transistor Q3 and where another end b of the primary winding is connected to the source electrode of the fourth switching transistor Q4; and a voltage doubler rectification circuit that includes a first diode D1, a second diode D2, a first capacitor C1 and a second capacitor C2, and is connected between one end c and another end d of a secondary winding of the transformer T1.

The optimizer further includes: a first power collection circuit 110 that connects a connection point between the source electrode of the second switching transistor Q2 included in the switching means 300 and the one end a of the primary winding of the transformer T1 included in the voltage doubler rectification means 400, to a drain electrode of a sixth switching transistor Q6 included in the solar photovoltaic power generation input means 200A; and a second power collection circuit 120 that includes a switching transistor Q7 whose source electrode is connected to the other end b of the primary winding of the transformer T1, whose drain electrode is connected to a drain electrode of the fifth switching transistor Q5 included in the switching means 300 and whose source electrode is connected to a source electrode of the switching transistor Q6 included in the first power collection circuit 110 and the anode electrode of the diode D3.

The optimizer supplies energy of the inductance L1 at a rise time and a fall time (typically, at dawn or sunset) when the generated output of the solar photovoltaic panel 50 is small, to a load from the transformer T1 through the voltage doubler rectification means 400.

(2) The voltage doubler rectification means 400 of the solar photovoltaic output optimizer circuit 100 includes: the transformer T1 where the one end a of the primary winding is connected to the connection point between the source electrode of the switching transistor Q2 and the drain electrode of the switching transistor Q3, these transistors being included in the switching means 300;

a diode D1 whose anode electrode is connected to one end c of the secondary winding of the transformer T1 and whose cathode electrode is connected to a "+" output terminal 104 of the voltage doubler rectification means 400, and a diode D2 whose cathode electrode is connected to the one end c of the secondary winding of the transformer T1 and whose anode electrode is connected to a "−" output terminal of the voltage doubler rectification means 400; and a capacitor C1 whose one end is connected to another end d of the secondary winding of the transformer T1 and whose other end is connected to the "+" output terminal 104 of the voltage doubler rectification means 400, and a capacitor C2 whose one end is connected to the other end d of the secondary winding of the transformer T1 and whose other end is connected to the "−" output terminal 105 of the voltage doubler rectification means 400.

(3) As shown in FIG. 7, one output of the solar photovoltaic output optimizer circuit 100 according to the present invention is connected to a power conditioner 150 that outputs AC power to an external system.

(4) Likewise, the solar photovoltaic output optimizer circuit 100 according to the present invention is connected to each of a plurality of solar photovoltaic panels 50 whose outputs are connected in parallel.

It is a matter of course that the present invention can be variously modified without departing from the technical thought described in the configuration described above and the detailed description of the invention described later.

Advantageous Effects of Invention

The solar photovoltaic output optimizer circuit according to the present invention allows a step-up circuit and a step-down circuit provided for an input circuit thereof to effectively utilize generated energy of a PV panel, and achieves a stable operation against variation in output of the PV panel without any loss of the switching transistors.

The configuration of the present invention discharges the energy accumulated in the inductance in a state where the inductance L1 and the transformer T1 are connected to each other in series, thus supplying the discharge energy to the load connected to the secondary winding of the transformer T1. Accordingly, the solar photovoltaic power generation system can be achieved that suppresses heat generation of the sixth and seventh switching transistors Q6 and Q7 and the third diode D3 included in the input means 200A, and achieves a stable operation and a high power generation efficiency.

BRIEF DESCRIPTION OF DRAWINGS

FIG. 1 is a diagram for illustrating an embodiment of a solar photovoltaic output optimizer circuit according to the present invention.

FIG. 2 is an operation timing waveform diagram showing the levels of gate signals of switching transistors constituting the circuit in FIG. 1.

FIG. 3 is a diagram for illustrating a solar photovoltaic output optimizer circuit (configuration example 1) according to the invention of the present inventor forming the basis of the solar photovoltaic output optimizer circuit of the present invention.

FIG. 4 is an operation timing waveform diagram showing the levels of gate signals of switching transistors constituting the circuit in FIG. 3.

FIG. 5 is a diagram for illustrating another solar photovoltaic output optimizer circuit (configuration example 2) according to the invention of the present inventor forming the basis of the solar photovoltaic output optimizer circuit of the present invention.

FIG. 6A is a block diagram for illustrating a control circuit that generates gate signals Q1-G to Q7-G to control turning on and off of the switching transistors constituting the solar photovoltaic output optimizer circuit described with reference to FIGS. 3 and 5.

FIG. 6B is a block diagram for illustrating a control circuit that generates gate signals Q1-G to Q8-G to control turning on and off of the switching transistors constituting the solar photovoltaic output optimizer circuit according to the present invention.

FIG. 7 is a diagram for illustrating a basic configuration example of a solar photovoltaic panel power generation system, and a connection state of a solar photovoltaic output optimizer circuit according to the present invention.

FIG. 8 is a circuit diagram illustrating a basic configuration of a conventional PV optimizer.

FIG. 9 is a waveform diagram showing the levels of gate signals in operation of switching transistors constituting the circuit in FIG. 8.

FIG. 10 is a waveform diagram of switching signals of the switching transistors in a case where the amount of irradiation on a PV panel is small and an Aa interval and a Ba interval are shortened.

DESCRIPTION OF EMBODIMENTS

Embodiments for implementing the present invention are hereinafter described in detail with reference to the drawings of configuration examples and exemplary embodiments. First, a configuration example forming the basis of a solar photovoltaic output optimizer circuit that forms a basic invention of the present invention is described.

Configuration Example 1

FIG. 3 is a diagram for illustrating a solar photovoltaic output optimizer circuit (configuration example 1) according to the invention of the present inventor forming the basis of the solar photovoltaic output optimizer circuit of the present invention. FIG. 4 is an operation timing waveform diagram showing the levels of gate signals of switching transistors constituting the circuit in FIG. 3. FIG. 4 also includes the operation timing waveform described in the conventional art, in order to clarify the description of the operation of this configuration example. "4" in FIG. 4 corresponds to encircled 4 in FIG. 9, and "1" corresponds to encircled 1 in FIG. 10.

The PV optimizer circuit 100 of the configuration example 1 shown in FIG. 3 includes PV input means 200, switching means 300, and voltage doubler rectification means 400. The configurations of the switching means 300 and the voltage doubler rectification means 400 are analogous to those of the conventional PV optimizer described above. Some of the action and operation of the circuit depend on the description of the conventional art, and the description is sometimes redundant partially.

In FIG. 3, the "+" output and "−" output of the PV panel (50 in FIG. 7) are input into a PV input 101 (IN+) and a PV input 102 (IN−: ground) of the optimizer 100. Reference signs Q1, Q2, Q3, Q4 and Q5 denote first, second, third, fourth and fifth switching transistors, respectively. A MOSFET for N-channel power is adopted therefor. The enhancement type shown in the diagram is preferable for this circuit. However, the type is not necessarily limited thereto. Any type having similar functions may be adopted instead. This also applies to the other diagrams.

A surge protection circuit 250 is connected to a PV input 101 (IN+) side (end a) of an inductance L1 included in the PV input means 200 and to the other end b of this inductance L1. The surge protection circuit 250 is connected in parallel to the inductance L1. The other end b of the inductance L1 is connected to the switching means 300 that includes the first switching transistor Q1, the second switching transistor Q2, the third switching transistor Q3, the fourth switching transistor Q4 and the fifth switching transistor Q5. A DC voltage output of the voltage doubler rectification means 400 is input into a power conditioner 150 that converts the input voltage into an AC voltage output and outputs it to an external system.

An end a of the primary winding on the primary side of a transformer T1 included in the voltage doubler rectification means 400 is connected to the source electrode of the second switching transistor Q2 included in the switching means 300 and to the drain electrode of the third switching transistor Q3. The other end b on the primary side of the transformer T1 is connected to the source electrode of the fourth switching transistor Q4 and to the drain electrode of the fifth switching transistor Q5.

An end c of secondary winding (on the secondary side) of the transformer T1 that has the same polarity as the end a on the primary side is connected to the anode of a first diode D1 and the cathode of a second diode D2. Another end d is connected to a series connection point between a first capacitor C1 and a second capacitor C2, which are connected in series. One end of the first capacitor C1 is connected to the cathode of the first diode D1 and one output 104 (OUT+) between the optimizer outputs. One end of the second capacitor C2 is connected to the anode of the second diode D2 and the other output 105 (OUT−) between the optimizer outputs.

The source electrode of the first switching transistor Q1 included in the switching means 300, the source electrode of the third switching transistor Q3, and the source electrode of the fifth switching transistor Q5 are connected to the ground. The second transistor Q2 and the fourth switching transistor Q4 constitute a high-side switch. The third switching transistor Q3 and the fifth switching transistor Q5 constitute a low-side switch.

The surge protection circuit 250 provided for the input means 200 includes: the inductance L1 whose end a is connected to the input 101 (IN+) for receiving the (+) output of the PV panel; the sixth switching transistor (one switching transistor) Q6 whose source electrode is connected through a third diode (one diode) D3 to the one end a of the inductance L1 and whose drain electrode is connected to the other end b of the inductance L1; and the seventh switching transistor (other switching transistor) Q7 whose drain electrode is connected to the source electrode of the sixth switching transistor Q6 and whose source electrode is connected to the ground. The third diode D3, whose anode is connected to the source electrode of the sixth switching transistor Q6 and whose cathode is connected to the one terminal a of the inductance L1, is connected between the source electrode of the sixth switching transistor Q6 and the one terminal a of the inductance L1.

The circuit further includes a fourth diode (other diode) D4 whose cathode is connected to the connection point between the source electrode of the sixth switching transistor Q6 and the drain electrode of the seventh switching transistor Q7 and whose anode is connected to the ground. The fourth diode (other diode) D4 may be omitted in a case where a parasitic diode (not shown in the circuit diagram) present in the inside of the seventh switching transistor Q7 can substitute for the fourth diode. In the case where the parasitic diode present in the seventh switching transistor Q7 can substitute, the characteristics (maximum forward current value and the like) of the parasitic diode include characteristics required for the fourth diode.

Thus, the configuration example 1 has a configuration that includes, in the input circuit, the sixth switching transistor Q6, or the sixth switching transistor Q6 and seventh switching transistor Q7, in order to prevent the surge voltage from occurring in the inductance L1.

The output of the PV optimizer 100 is input into the power conditioner 150 (see FIG. 7), and is output as a predetermined AC voltage to the commercial power system.

The sixth switching transistor Q6 and the seventh switching transistor Q7 operate only when the power output of the PV panel is small and normal control cannot be performed. As the power output increases, Q6 is automatically brought into a state of being OFF through PWM control or PFM control in midstream. The "midstream" is any time point in the first or latter half range of the switching period T during which the PWM control or PFM control is executed.

Hereinafter, the operation of the surge protection circuit is sequentially described with reference to FIG. 4. In the diagram, T denotes a time period of one period of the switching frequency, "A" denotes the first half of the time period T, and "B" denotes the latter half of this time period. "Q1-G" to "Q7-G" denote application levels and timing of gate signals (gate pulses) for turning on and off the first to seventh switching transistors shown in FIG. 3. A high level "H" indicates the gate signal for turning on the switching transistor. A low level "L" indicates the gate signal for turning off the switching transistor.

FIG. 4 shows the control timing for the switching transistor in a case where the output of the PV panel is significantly small (At dawn, sunset, nightfall, etc.). In "A" in FIG. 4, the width of a pulse Aa of the gate signal Q1-G is significantly narrow (short duration), and the input voltage into the switching means 300 does not decrease much even if the power output of the PV panel is small. That is, the pulse width is that with a small effect of the load. The inductance L1 excited during the time period of the pulse width of the pulse Aa is transmitted to the end a on the primary side of the transformer T1 constituting the voltage doubler rectification means 400 in the time period of the pulse Ab. A long duration of the pulse Ab causes a short circuit. The time of exciting the end a on the primary side of the transformer T1 is limited to the duration of the pulse Ab, and the second switching transistor Q2 is turned on and then turned off.

Thus, the transformer T1 of the voltage doubler rectification means 400 and the inductance L1 of the input means 200 are terminated. However, the surge voltage to occur in the inductance L1 can be absorbed by short-circuiting the added sixth switching transistor Q6 at the same time. At the same time, the third switching transistor Q3 is turned on to short-circuit the transformer T1. The seventh switching transistor Q7 is set in a phase opposite to that of the sixth switching transistor Q6 and charging the power source of a high-side driver is performed in the time period Aa+Ab.

Likewise, also in a case of "B" in FIG. 4, the width of a pulse Ba of the first switching transistor Q1-G is set significantly short as with the case of the pulse Aa of "A", the fourth switching transistor Q4 is turned on and transmission is made to the other end b on the primary side of the transformer T1 in a limited time of Bb after excitation of the inductance L1, and then the fourth switching transistor Q4 is turned off.

Thus, the transformer T1 and the inductance L1 are terminated. Consequently, the surge voltage to occur in the inductance L1 can be absorbed by short-circuiting the added sixth switching transistor Q6 at the same time. At the same time, the fifth switching transistor Q5 is turned on to short-circuit the transformer T1. Likewise, in the case of the seventh switching transistor Q7, the power source of the high-side driver is charged in the time period Ba+Bb in a phase opposite to that of the sixth switching transistor Q6.

FIG. 4 shows the control timing for the switching transistor in a case where the power output of the PV panel is large. As the power output of the PV panel increases, the increase is detected and control is performed, which causes the transformer T1 to slightly increase the widths of the pulse Aa and pulse Ba of the gate signal Q1-G of the first switching transistor Q1 to in turn increase the excitation time for the inductance L1. The widths of the pulse Ab and pulse Bb, which are transmission time for the transformer T1 after excitation of the inductance L1, are controlled so as to be increased in proportion to the pulse width of the gate signal Q1-G of the first switching transistor Q1. This control increases the width of the pulse Aa and the width of the pulse Ba of the gate signal Q1-G to a certain extent and, in turn, increases the width of the pulse Ab and the width of the pulse Bb (increases time), which are transmission time of the transformer T1, and reduces the time of pulse Ac and pulse Bc in which the transmission is off at the same time.

FIG. 4 shows the control timing for the switching transistor in a process during which the power output of the PV panel increases and reaches the normal operation state [4]. Through the control in FIG. 4, the waveform of control timing becomes that as show in FIG. 4, and is changed to the normal operation state (FIG. 4).

As described above, when the power output of the PV panel is significantly small, the state is brought into that where the period T of the switching frequency is increased and the pulse width of the gate signal is narrow, and the operation is started. With the maximum power point tracking control (MPPT), the period is reduced as the power output of the PV panel increases. When the period reaches a certain period, the pulse width is then increased, thereby achieving operation as that of the DC-DC converter for original MPPT control.

On the contrary, when it is becoming evening (at sunset) and the power output of the PV panel gradually decreases, the pulse width is gradually reduced while MPPT control is performed in a manner inverted to that in the above description. When the width decreases to a certain (minimum) pulse width, the period is then increased, and the state is in a waiting state until the control finally becomes impossible in the default state.

The configuration example 1 can prevent the surge voltage described above from occurring, by the operation of the protection circuit provided for the input circuit, prevent breakage of the switching transistors, and achieve stable operation even with variation in the output of the PV panel.

Configuration Example 2

FIG. 5 is a circuit diagram for illustrating a configuration example 2 according to the invention of the present inventor forming the basis of the solar photovoltaic output optimizer circuit of the present invention. In the aforementioned configuration example 1, the input means 200 is provided with the surge protection circuit that includes the sixth switching transistor Q6 and the seventh switching transistor Q7. In Embodiment 2, the surge protection circuit provided for the input means 200 is configured by removing the seventh switching transistor Q7 from the circuit shown in FIG. 3 and by including only the sixth switching transistor Q6, the third diode D3 and the fourth diode D4.

The operation of the solar photovoltaic output optimizer circuit of the configuration example 2 of the present invention shown in FIG. 5 is that obtained by removing the portion corresponding to the seventh switching transistor Q7 in the description of the configuration example 1. That is, the circuit is that obtained by removing the high-side driver power source.

Also according to the configuration example 2, a configuration of the high-side driver made up of an insulation type circuit can prevent the surge voltage from occurring by the operation of the protection circuit provided for the input circuit, prevent breakage of the switching transistors, and achieve stable operation even with variation in the output of the PV panel.

Next, control signal generation by the switching transistors described in the configuration example 1 and the configuration example 2 described above will be described. FIG. 6A is a block diagram for illustrating a control circuit that generates gate signals Q1-G to Q7-G to control turning on and off of the switching transistors constituting the solar photovoltaic output optimizer circuit of the configuration example 1 described above. This control circuit 500 includes a microprocessor 1000, various sensors (detection circuit), and MOS drivers for driving the gates of the switching transistors.

The microprocessor 1000 includes a control logic 1001, an MPPT control unit 1002, a PWM control unit 1003, a PFM control unit 1004, a timer control unit 1006, and a port 1005. This port 1005 is connected with a PV voltage detection circuit 1101 that detects the voltage of the PV panel, a PV current detection circuit 1102 that detects the current of the PV panel, an output voltage detection circuit 1201 that detects the output voltage of the solar photovoltaic output optimizer circuit 100, an output current detection circuit 1202 that detects the output current thereof, and various MOS drivers.

The various MOS drivers include: a low-side MOS driver 1301 that drives the first switching transistor Q1, a high-side MOS driver 1302 that drives the second switching transistor Q2, a low-side MOS driver 1303 that drives the third switching transistor Q3, a high-side MOS driver 1304 that drives the fourth switching transistor Q4, a low-side MOS driver 1305 that drives the fifth switching transistor Q5, a high-side MOS driver 1306 that drives the sixth switching transistor Q6, and a MOS driver 1307 that drives the seventh switching transistor Q7.

Before the gates of the switching transistors, the respective MOS drivers for driving the gates are provided. The drivers are connected to the respective signals generated by the control circuit in FIG. 6A to control turning on and off the switching transistors.

All the signals of the control circuit are controlled by the microprocessor (MPU) 1000. The MPU 1000 generates a signal for the control logic 1001 based on a control input signal according to programmed software, and transmits the drive signals (gate signals) to the switching transistors. Input and output signals of the MPU 1000 form a feedback (FB) loop.

Input signals used by the MPU 1000 to control the solar photovoltaic output optimizer circuit 100 are transmitted to the control logic unit 1001 of this MPU through the input port 1005 from the detection circuits, which are the PV voltage detection circuit 1101, the PV current detection circuit 1102, the output voltage detection circuit 1201, and the output current detection circuit 1202.

The MPU 1000 includes the PWM control unit 1003, the PFM control unit 1004, the timer control unit 1006, and the MPPT control unit 1002, for basic control. The control logic unit 1001 forms an optimal control logic on the basis of the control units and the detected signals input from the detection circuits. Finally, signals used for driving the gates of the switching transistors are generated by the control logic unit, and transmitted through the port 1005 to the drivers 1301 to 1307 (FIG. 6A).

FIG. 7 is a diagram for illustrating a connection state of a solar photovoltaic output optimizer circuit according to the configuration example and the present invention in a solar photovoltaic panel power generation system. The output of the PV panel 50 is connected to the inputs 101 (IN+) and 102 (IN−) of the solar output (PV) optimizer 100. Specifically, the output voltage range of the PV panel 50 is 30 to 60 V/300 W (current is 10 Amax). The value is not necessarily limited thereto, and may be another value, according to selection of the constant and the like (e.g., the winding ratio of the transformer T1).

The outputs 104 (OUT+) and 105 (OUT−) of the PV optimizer 100 are connected to the respective inputs 106 (DC+) and 107 (DC−) of the power conditioner 150. The recommended input voltage of the power conditioner 150 is that of a constant voltage load with 700 to 800V. However, a certain extent of voltage range is allowed. The selection of the constant and the like allows input with further wide voltage range. The AC output of the power conditioner 150 is connected to the commercial power system and the like, not shown.

In an actual connection, the PV panel 50 at a solar photovoltaic power generation site is made up of a plurality of panels. Consequently, the PV optimizers 100 according to the present invention are attached to the respective PV panels, and all the outputs thereof are connected in parallel. Unlike series connection for a typical PV panel, a concept of string is absent. Consequently, each PV panel can output the maximum power.

Solar photovoltaic output optimizer circuits according to the present invention based on the configuration example described above are described with reference to the drawings of Embodiments.

Embodiment 1

FIG. 1 is a diagram for illustrating an embodiment of a solar photovoltaic output optimizer circuit according to the present invention. FIG. 2 is an operation timing waveform diagram showing the levels of gate signals of switching transistors constituting the circuit in FIG. 1.

In FIG. 1, this embodiment is connected between the output of the PV panel 50 and the power conditioner 150 for an object similar to the objects of the configuration examples 1 and 2 in that the circuit is an optimizer circuit for supply for the power conditioner 150 described with reference to FIG. 7 in a form suitable for the processes thereof.

FIG. 1 shows the solar photovoltaic output optimizer circuit that is used for a solar photovoltaic power generation system that can effectively and stably use the power even in a case where the generated output (power) of the solar photovoltaic panel having varying output is low.

That is, the solar photovoltaic output optimizer circuit of this embodiment includes: solar photovoltaic power generation input means 200A for receiving the generated output of the solar photovoltaic panel 50 (see FIG. 7); switching means 300 for converting the DC voltage input into the solar photovoltaic power generation input means 200A into a predetermined pulse voltage or AC voltage; and voltage doubler rectification means 400 for further stepping up the power output of the switching means 300 to a predetermined voltage.

The solar photovoltaic power generation input means 200A includes: an inductance L1 whose one end a is connected to a "+" output of the solar photovoltaic panel 50; a third diode D3 whose cathode electrode is connected to the one end a; an eighth switching transistor Q8 whose drain electrode is connected to an anode electrode of the third diode D3 and whose source electrode is grounded; and a fourth diode D4 whose cathode electrode is connected to the anode electrode of the third diode D3 and whose anode electrode is grounded.

The switching means 300 includes: a first switching transistor Q1 whose drain is connected to another end b of the inductance L1 and whose source electrode is grounded; a second switching transistor Q2 whose drain electrode is connected to the other end b of the inductance L1; a third switching transistor Q3 whose drain electrode is connected to a source electrode of the second switching transistor Q2 and whose source electrode is grounded; a fourth switching transistor Q4 whose drain electrode is connected to the other end b of the inductance L1; and a fifth switching transistor Q5 whose drain electrode is connected to a source electrode of the fourth switching transistor Q4 and whose source electrode is grounded.

The voltage doubler rectification means 400 includes: a transformer T1 where one end a of a primary winding is connected to a connection point between the source electrode of the second switching transistor Q2 and the drain electrode of the third switching transistor Q3 and where another end b of the primary winding is connected to the source electrode of the fourth switching transistor Q4; and a voltage doubler rectification circuit that includes a first diode D1, a second diode D2, a first capacitor C1 and a second capacitor C2, and is connected between one end c and another end d of the secondary winding of the transformer T1.

This embodiment includes: a first power collection circuit 110 that connects a connection point between the source electrode of the second switching transistor Q2 included in the switching means 300 and the one end a of the primary winding of the transformer T1 included in the voltage doubler rectification means 400 to a drain electrode of a sixth switching transistor Q6 included in the solar photovoltaic power generation input means 200A; and a second power collection circuit 120 that includes a seventh switching transistor Q7 whose drain electrode is connected to the drain electrode of the fifth switching transistor Q5 included the switching means 300 and whose source electrode is connected a source electrode of the sixth switching transistor Q6 included in the first power collection circuit 110 and the anode electrode of the diode D3.

FIG. 6B is a block diagram for illustrating a control circuit that generates gate signals Q1-G to Q8-G to control turning on and off of the switching transistors constituting the solar photovoltaic output optimizer circuit according to the embodiment of the present invention shown in FIG. 1. This control circuit 501 includes a microprocessor 1000, various sensors (detection circuit), and MOS drivers for driving the gates of the switching transistors. FIG. 6B is different from FIG. 6A in that a MOS driver 1308 that controls the eighth switching transistor Q8 is further provided. The basic configuration and operation are analogous to those in FIG. 6A described above.

The microprocessor 1000 includes a control logic 1001, an MPPT control unit 1002, a PWM control unit 1003, a PFM control unit 1004, a timer control unit 1006, and a port 1005. This port 1005 is connected with a PV voltage detection circuit 1101 that detects the voltage of the PV panel, a PV current detection circuit 1102 that detects the current of the PV panel, an output voltage detection circuit 1201 that detects the output voltage of the solar photovoltaic output optimizer circuit 100, an output current detection circuit 1202 that detects the output current thereof, and various MOS drivers.

The various MOS drivers include: a low-side MOS driver 1301 that drives the first switching transistor Q1, a high-side MOS driver 1302 that drives the second switching transistor Q2, a low-side MOS driver 1303 that drives the third switching transistor Q3, a high-side MOS driver 1304 that drives the fourth switching transistor Q4, a low-side MOS driver 1305 that drives the fifth switching transistor Q5, a high-side MOS driver 1306 that drives the sixth switching transistor Q6, a high-side MOS driver 1307 that drives the seventh switching transistor Q7, and a low-side MOS driver 1308 that drives the eighth switching transistor Q8.

Before the gates of the switching transistors, the respective MOS drivers for driving the gates are provided. The drivers are connected to the respective signals generated by the control circuit in FIG. 6B to control turning on and off of the switching transistors.

All the signals of the control circuit are controlled by the microprocessor (MPU) 1000. The MPU 1000 generates a signal for the control logic 1001 based on a control input signal according to programmed software, and transmits the drive signals (gate signals) shown in FIG. 2 to the switching transistors.

FIG. 2 (1) shows the control timing for the switching transistors Q1 to Q8 in a case where the output of the PV panel is significantly small.

FIG. 2 (2) shows the control timing for the switching transistors Q1 to Q8 in a case where the output of the PV panel increases but does not reach the normal operation state.

FIG. 2 (3) shows the control timing for the switching transistors Q1 to Q8 in a state where the output of the PV panel is in the normal operation state.

Input and output signals of the MPU 1000 form a feedback (FB) loop.

Input signals used by the MPU 1000 to control the solar photovoltaic output optimizer circuit 100 are transmitted to the control logic unit 1001 of this MPU through the input port 1005 from the detection circuits, which are the PV voltage detection circuit 1101, the PV current detection circuit 1102, the output voltage detection circuit 1201, and the output current detection circuit 1202.

The MPU 1000 includes the PWM control unit 1003, the PFM control unit 1004, the timer control unit 1006, and the MPPT control unit 1002, for basic control. The control logic unit 1001 forms an optimal control logic on the basis of the control units and the detected signals input from the detection circuits. Finally, signals used for driving the gates of the switching transistors are generated by the control logic unit, and transmitted through the port 1005 to the drivers 1301 to 1308.

According to this configuration, even in the case where the generated output of the solar photovoltaic panel 50 is small, the power at the rise time and fall time wasted in the existing system can be collected and supplied to the load through the transformer T1.

Note that the voltage doubler rectification means 400 of the solar photovoltaic output optimizer circuit 100 includes: the transformer T1 where one end a of the primary winding is connected to a connection point between the source electrode of the second switching transistor Q2 and the drain electrode of the third switching transistor Q3, these transistors being included in the switching means 300; the first diode D1 whose anode electrode is connected to the one end c of the secondary winding of the transformer T1 and whose cathode electrode is connected to a "+" output terminal of the voltage doubler rectification means 400; the second diode D2 whose cathode electrode is connected to the one end c of the secondary winding of the transformer T1 and whose anode electrode is connected to the "−" output terminal of the voltage doubler rectification means 400; the capacitor C1 whose one end is connected to another end d of the secondary winding of the transformer T1 and whose other end is connected to the "+" output terminal 104 of the voltage doubler rectification means 400; and the capacitor C2 whose one end is connected to the other end d of the secondary winding of the transformer T1 and whose other end is connected to the "−" output terminal 105 of the voltage doubler rectification means 400.

One output of the solar photovoltaic output optimizer circuit 100 is connected to the power conditioner 150 that outputs AC power to an external system (power system). The solar photovoltaic output optimizer circuit 100 is connected to each of a plurality of solar photovoltaic panels 50 whose outputs are connected in parallel.

INDUSTRIAL APPLICABILITY

In the above embodiments, the present invention is described as application to the power harvesting system that includes the solar photovoltaic panel.

Alternatively, the present invention is also applicable to an energy source that has varying power output, for example, a step-up system of a battery and a storage battery in an analogous manner.

REFERENCE SIGNS LIST

50 . . . Solar photovoltaic panel (PV panel)
100 . . . PV optimizer
101 . . . PV input (+)
102 . . . PV input (−)
103 . . . Gate terminal of seventh switching transistor Q7
104 . . . PV output (+)
105 . . . PV output (−)
110 . . . First power collection circuit
120 . . . Second power collection circuit
150 . . . Power conditioner
200 . . . Input means
300 . . . Switching means
400 . . . Voltage doubler rectification means
Q1 to Q8 . . . First to eighth switching transistors (MOSFET)
D1 to D4 . . . First to fourth diodes
C1, C2 . . . First and second capacitors
L1 . . . Inductance
T1 . . . Transformer

The invention claimed is:

1. A solar photovoltaic output optimizer circuit used for a solar photovoltaic power generation system for stably harvesting power from generated output of a solar photovoltaic panel having varying output,
wherein the optimizer circuit includes: solar photovoltaic power generation input means for receiving the generated output of the solar photovoltaic panel; switching means for converting DC voltage input into the solar photovoltaic power generation input means into a predetermined pulse voltage or AC voltage; and voltage doubler rectification means, and the solar photovoltaic power generation input means includes: an inductance whose one end is connected to a "+" output of the solar photovoltaic panel; a third diode whose cathode electrode is connected to the one end; an eighth switching transistor whose drain electrode is connected to an anode electrode of the third diode and whose source electrode is grounded; and a fourth diode whose cathode electrode is connected to the anode electrode of the third diode and whose anode electrode is grounded, the switching means includes:
a first switching transistor whose drain is connected to another end of the inductance and whose source electrode is grounded; and
a second switching transistor whose drain electrode is connected to the other end of the inductance; a third switching transistor whose drain electrode is connected to a source electrode of the second switching transistor and whose source electrode is grounded; a fourth switching transistor whose drain electrode is connected to the other end of the inductance; and a fifth switching transistor whose drain electrode is connected to a source electrode of the fourth switching transistor and whose source electrode is grounded, the voltage doubler rectification means includes:
a transformer where one end of a primary winding is connected to a connection point between the source electrode of the second switching transistor and the drain electrode of the third switching transistor and where another end of the primary winding is connected to the source electrode of the fourth switching transistor; and
a voltage doubler rectification circuit connected to a secondary winding of the transformer, the optimizer circuit further includes: a first power collection circuit that connects a connection point between the source electrode of the second switching transistor included in the switching means and the one end of the primary winding of the transformer included in the voltage doubler rectification means, to a drain electrode of a sixth switching transistor included in the solar photovoltaic power generation input means; and a second power collection circuit that includes a seventh switching transistor whose source electrode is connected to the other end of the primary winding of the transformer, whose drain electrode is connected to the drain electrode of the fifth switching transistor included in the switching means and whose source electrode is connected to a source electrode of the sixth switching transistor included in the first power collection circuit and the anode electrode of the third diode, and the optimizer circuit supplies energy of the inductance at a rise time and a fall time when the generated output of the solar photovoltaic panel is small, to a load from the transformer through the voltage doubler rectification means.

2. The solar photovoltaic output optimizer circuit according to claim 1, wherein
the voltage doubler rectification means of the solar photovoltaic output optimizer circuit includes: a transformer where one end a of the primary winding is connected to a connection point between the source electrode of the second switching transistor and the drain electrode of the third switching transistor, these transistors being included in the switching means;

a first diode whose anode electrode is connected to one end of the secondary winding of the transformer and whose cathode electrode is connected to a "+" output terminal of the voltage doubler rectification means, and a second diode whose cathode electrode is connected to the one end of the secondary winding of the transformer and whose anode electrode is connected to a "−" output terminal of the voltage doubler rectification means; and a first capacitor whose one end is connected to another end of the secondary winding of the transformer and whose other end is connected to the "+" output terminal of the voltage doubler rectification means, and a second capacitor whose one end is connected to the other end of the secondary winding of the transformer and whose other end is connected to the "−" output terminal of the voltage doubler rectification means.

3. The solar photovoltaic output optimizer circuit according to claim 1,
wherein one output of the solar photovoltaic output optimizer circuit is connected to a power conditioner that outputs AC power to an external system.

4. The solar photovoltaic output optimizer circuit according to claim 1,
wherein the solar photovoltaic output optimizer circuit is connected to each of a plurality of solar photovoltaic panels whose outputs are connected in parallel.

\* \* \* \* \*